United States Patent
Breuer et al.

(10) Patent No.: US 10,474,830 B2
(45) Date of Patent: *Nov. 12, 2019

(54) AUTOMATED MANAGEMENT OF CONFIDENTIAL DATA IN CLOUD ENVIRONMENTS

(71) Applicant: International Business Machines Corporation, Armonk, NY (US)

(72) Inventors: Marcus Breuer, Dalheim (DE); Itzhack Goldberg, Hadera (IL); Thorsten Muehge, Budenheim (DE); Erik Rueger, Ockenheim (DE); Matthias Seul, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,111

(22) Filed: Apr. 20, 2018

(65) Prior Publication Data

US 2018/0239911 A1    Aug. 23, 2018

Related U.S. Application Data

(63) Continuation of application No. 14/948,969, filed on Nov. 23, 2015, now Pat. No. 9,996,698.

(30) Foreign Application Priority Data

Dec. 9, 2014 (GB) .................................. 1421826.7

(51) Int. Cl.
*H04L 29/06* (2006.01)
*G06F 12/14* (2006.01)
(Continued)

(52) U.S. Cl.
CPC .......... *G06F 21/602* (2013.01); *G06F 3/067* (2013.01); *G06F 3/0622* (2013.01); *G06F 3/0637* (2013.01); *G06F 21/6218* (2013.01)

(58) Field of Classification Search
CPC ...... G06F 21/602; G06F 3/0622; G06F 3/067; G06F 3/0637; G06F 21/6218
(Continued)

(56) References Cited

U.S. PATENT DOCUMENTS 8,205,078 B2    6/2012  Bhogal et al.
8,612,284 B1 *  12/2013  Sharif .................... G06F 3/067
                                                             705/400

(Continued)

FOREIGN PATENT DOCUMENTS

CN    103763355 A    4/2014
CN    103782302 A    5/2014
(Continued)

OTHER PUBLICATIONS

Burns, "Protecting Information in a Cloud Computing Environment: The need to protect the confidentiality, integrity and availability of information hasn't really changed much in the last 100 years." CHIPS the Department of the Navy's Information Technology Magazine, Jan.-Mar. 2012, pp. 1-4, Online ISSN 2154-1779, Print ISSN 1047-9988, http://www.doncio.navy.mil/CHIPS/ArticleDetails.aspx?ID=3574.
(Continued)

*Primary Examiner* — Aravind K Moorthy
(74) *Attorney, Agent, or Firm* — Scott S. Dobson

(57) ABSTRACT

A shared networked storage may be separated from a key vault system. A storage request with data to be stored and the storage request with a confidentiality rating may be received. The confidentiality rating may indicate a level of confidentiality the data is associated with. The storage
(Continued)

request with the data and the confidentiality rating may be received via a shared networked storage access interface by a security layer. The data to be stored by the key vault system and the confidentiality rating may be encrypted on request of the security layer and into a data container. The shared networked storage may be categorized into Cloud zones. Each Cloud zone may be assigned a trust level. The data container may be stored in one of the Cloud zones of the shared networked storage. The trust level of the one of the Cloud zones may correspond to the confidentiality rating.

17 Claims, 8 Drawing Sheets

(51) Int. Cl.
    *G06F 7/04* (2006.01)
    *G06F 17/00* (2019.01)
    *G06F 21/60* (2013.01)
    *G06F 21/62* (2013.01)
    *G06F 3/06* (2006.01)

(58) Field of Classification Search
    USPC ...... 713/164, 153, 165, 166, 189; 726/7, 12, 726/26
    See application file for complete search history.

(56) References Cited

U.S. PATENT DOCUMENTS

| | | | |
|---|---|---|---|
| 8,751,463 B1* | 6/2014 | Chamness | G06F 3/0641 |
| | | | 707/693 |
| 9,225,691 B1* | 12/2015 | Balasubramanian | G06F 21/00 |
| 9,471,245 B1* | 10/2016 | Shilane | G06F 11/2056 |
| 9,665,306 B1* | 5/2017 | Patwardhan | G06F 3/065 |
| 9,996,698 B2* | 6/2018 | Breuer | G06F 21/602 |
| 2003/0044020 A1 | 3/2003 | Aboba et al. | |
| 2008/0080718 A1 | 4/2008 | Meijer et al. | |
| 2011/0022642 A1* | 1/2011 | deMilo | G06F 21/602 |
| | | | 707/805 |
| 2011/0219424 A1 | 9/2011 | Panasyuk et al. | |
| 2012/0066498 A1 | 3/2012 | Engert | |
| 2012/0290483 A1 | 11/2012 | Hezrony | |
| 2013/0179985 A1 | 7/2013 | Strassmann et al. | |
| 2013/0198740 A1 | 8/2013 | Arroyo et al. | |
| 2013/0346450 A1* | 12/2013 | Procopio | G06F 21/6218 |
| | | | 707/783 |
| 2014/0006350 A1 | 1/2014 | Fukui et al. | |
| 2014/0050317 A1 | 2/2014 | Sabin | |
| 2014/0075568 A1 | 3/2014 | Sathyadevan et al. | |
| 2014/0095865 A1 | 4/2014 | Yerra et al. | |
| 2014/0123292 A1 | 5/2014 | Schmidt et al. | |
| 2014/0150120 A1 | 5/2014 | Orsini et al. | |
| 2014/0157363 A1 | 6/2014 | Banerjee | |
| 2014/0164774 A1 | 6/2014 | Nord et al. | |
| 2014/0201846 A1 | 7/2014 | Anantharam et al. | |
| 2015/0006957 A1* | 1/2015 | Ginzinger | G06F 3/0605 |
| | | | 714/15 |
| 2015/0379292 A1* | 12/2015 | Lewis | G06F 21/6218 |
| | | | 713/165 |
| 2016/0162693 A1 | 6/2016 | Breuer et al. | |

FOREIGN PATENT DOCUMENTS

| | | |
|---|---|---|
| CN | 104113595 A | 10/2014 |
| EP | 2219190 A1 | 8/2010 |
| JP | 2001266112 A | 9/2001 |
| JP | 2003330783 A | 11/2003 |
| JP | 2013058101 A | 3/2013 |
| JP | 2013521587 A | 6/2016 |
| WO | 2013124758 A1 | 8/2013 |

OTHER PUBLICATIONS

Kanupriya, "Level-Based Data Security Model in Cloud Computing," International Journal of Innovative Technology and Exploring Engineering (IJITEE), vol. 4, Issue 2, Jul. 2014, pp. 68-71, ISSN: 2278-3075, Blue Eyes Intelligence Engineering & Sciences Publication Pvt. Ltd.

Mell et al., "The NIST Definition of Cloud Computing: Recommendations of the National Institute of Standards and Technology," U.S. Department of Commerce, Special Publication 800-145, Sep. 2011, Gaithersburg, MD, 7 pages.

Mukhopadhyay et al., "Enhanced Security for Cloud Storage using File Encryption," arXiv, Cornell University Library, 6 pages, http://arxiv.org/ftp/arxiv/papers/1303/1303.7075.pdf.

International Search Report dated Jun. 11, 2015 for International Application 1421826.7, 3 pages.

GB Application 1421826.7, entitled "Automated Management of Confidential Data in Cloud Environments," filed on Dec. 9, 2014, 43 pages.

PCT Application PCT/IB2015/058181, filed Oct. 23, 2015, 1 page.
International Search Report and Written Opinion, International Application No. PCT/IB2015/058181, International Filing Date Oct. 23, 2015.

List of Patents or Patent Applications Treated as Related, dated Apr. 19, 2018, 2 pages.

* cited by examiner

AUTOMATED MANAGEMENT OF CONFIDENTIAL DATA IN CLOUD ENVIRONMENTS

BACKGROUND

The invention relates generally to a method for storing data in a shared networked environment. The invention relates further to a storage sub-system for storing data in a shared networked environment, a computing system, a data processing program, and a computer program product.

More and more enterprises turn to Cloud computing as their preferred information technology consumption method—not only for software but also for infrastructure components and for storage of data. However, "the Cloud" cannot be seen as a homogenous more or less anonymous sphere. Storage capacities may be available from different Cloud storage providers under different contractual conditions and service levels. Some providers may guarantee a data storage within the boundaries of one jurisdiction; others may not give any guarantee.

In today's Cloud environments, data can be migrated between different instances, data pools or storage locations or even entire countries. This migration may happen as part of regular operations, e.g., synchronization of data, user interactions or even attacks on the Cloud infrastructure. All of these interactions constitute one central risk:

Confidential and/or sensitive data may be moved from a secure environment into an insecure environment making the data easily accessible and therefore, potentially exposing it to (hostile) outside sources.

A series of disadvantages are related to conventional technologies: e.g., there may be no automatic security provided. Data must be protected by the client before sending it to a Cloud environment. If the associated data storage area is compromised or even physically stolen, data are at risk.

Encryption may be difficult to be implemented and managed because client systems may have different encryption capabilities and also encryption may be simply forgotten to be used during a data upload to a Cloud storage environment by users. Also, when moving data between Cloud zones of different trustworthiness, a user needs to take into account whether data may be moved to a new location in case the location has insufficient protection or is hosted in a non-trusted geographic environment or country. However, there may be a need to provide a solution that allows a secure storage of data in Cloud environments and at the same time not require dealing with encryption requirements on a client side.

SUMMARY

This need may be addressed by a method for storing data in a shared networked environment, a storage sub-system for storing data in a shared networked environment, a computing system, a data processing program, and a computer program product.

According to one aspect, a method for storing data in a Cloud environment may be provided. The shared networked environment may comprise a security layer between a shared networked storage and a shared networked storage access interface. The method may comprise physically separating the shared networked storage including the security layer from a key vault system, and receiving a storage request together with data to be stored in the shared networked storage and together with a confidentiality rating, wherein the storage request together with data and the confidentiality rating is received via the shared networked storage access interface by the security layer.

The method may further comprise encrypting the data to be stored and the confidentiality rating on request of the security layer by the key vault system into a data container, categorizing the shared networked storage into Cloud zones, wherein each Cloud zone is assigned a trust level; and storing the data container in one of the Cloud zones of the Cloud storage such that the trust level of the one of the Cloud zones corresponds to the confidentiality rating.

According to another aspect, a storage sub-system for storing data in a shared networked environment may be provided. The shared networked environment may comprise a security layer between a shared networked storage and a shared networked storage access interface. The storage sub-system may comprise a shared networked storage including the security layer which is physically separated from a key vault system, wherein the shared networked storage comprises Cloud zones, wherein each of the Cloud zones has an assigned trust level, and a receiving unit adapted for receiving a storage request together with data to be stored in the Cloud storage and together with a confidentiality rating, wherein the storage request together with data and the confidentiality rating is received via the shared networked storage access interface by the security layer.

The key vault system may be adapted for encrypting the data to be stored and the confidentiality rating on request of the security layer into a data container.

Furthermore, the method may comprise a storage component adapted for storing the data container in one of the Cloud zones of the Cloud storage such that the trust level of the one of the Cloud zones corresponds to the confidentiality rating.

According to a further aspect, a shared networked storage system comprising the storage sub-system for storing data in a Cloud environment may be provided.

It may be noted that the shared networked storage may be viewed as a Cloud storage or a storage system in a Cloud environment.

BRIEF DESCRIPTION OF THE DRAWINGS

Preferred embodiments of the invention will now be described, by way of example only, and with reference to the following drawings.

DETAILED DESCRIPTION

Figure 1:
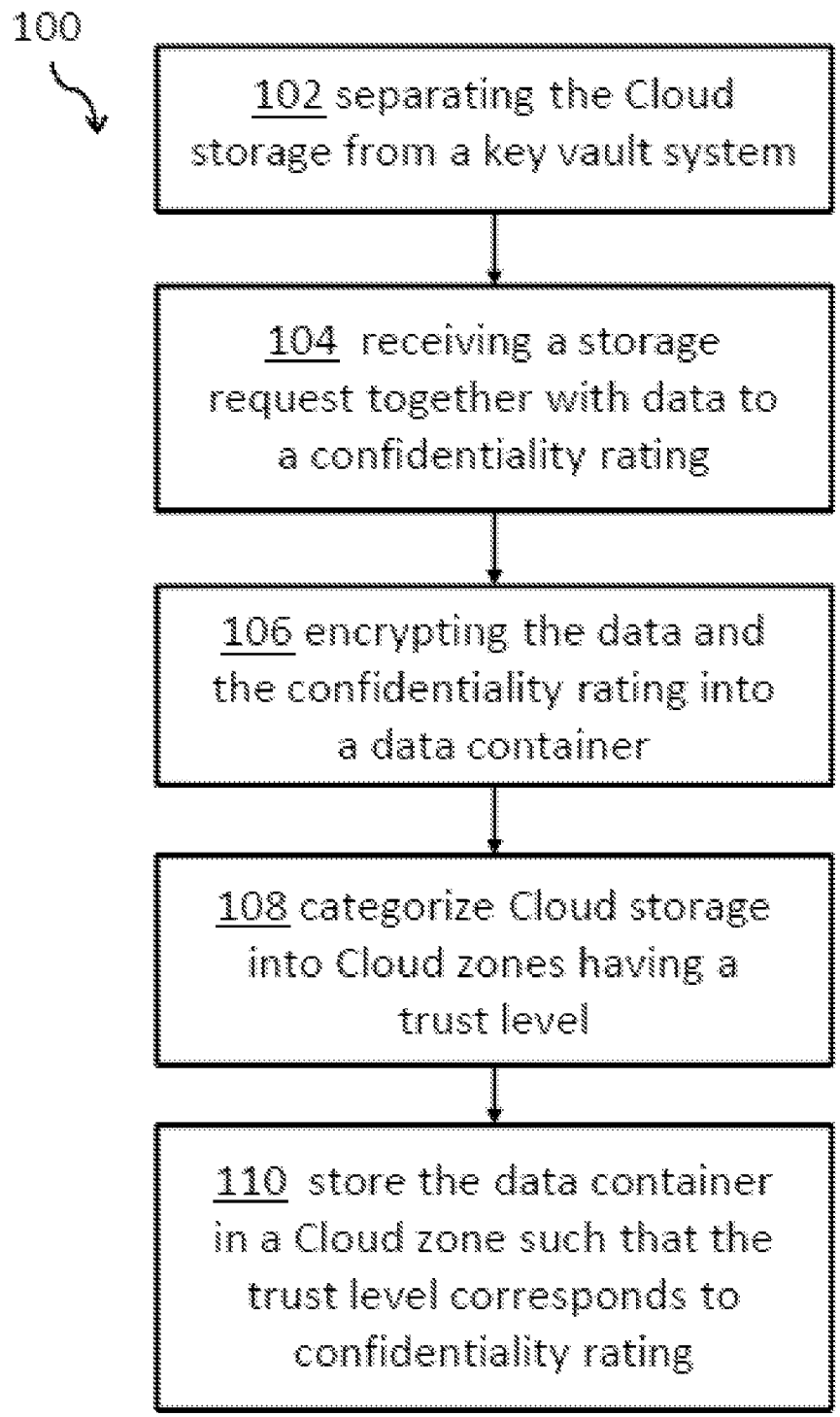
FIG. 1 shows a flow diagram of an embodiment of the inventive method.

In the context of this description, the following conventions, terms and/or expressions may be used:

The term "Cloud environment" may be used in the context of Cloud computing. In this document, also Cloud storage or Cloud storage service is mentioned several times. Such a service belongs to Cloud computing in general, which is a model for enabling convenient, on-demand network access to a shared pool of configurable computing resources (e.g., networks, servers, applications, and services)—in particular storage or networked storage—that can be rapidly provisioned and released with minimal management effort or service provider interaction. This Cloud model promotes availability and is composed of five essential characteristics, three service models and four deployment models. The shared networked storage may be deployed in a Cloud environment.

Essential Characteristics of Cloud computing comprise:

(i) On-demand self-service. A consumer can unilaterally provision computing capabilities, such as server time and network storage, as needed automatically without requiring human interaction with each service provider.

(ii) Broad network access. Capabilities are available over the network and accessed through standard mechanisms that promote use by heterogeneous thin or thick client platforms (e.g., mobile phones, laptops, and PDAs).

(iii) Resource pooling. The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

(iv) Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

(v) Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both the provider and consumer of the utilized service.

Service models for Cloud Computing used comprise:

(i) Cloud Software as a Service (SaaS). The capability provided to the consumer is to use the provider's applications running on a Cloud infrastructure. The applications are accessible from various client devices through a thin client interface such as a web browser (e.g., web-based e-mail). The consumer does not manage or control the underlying Cloud infrastructure including network, servers, operating systems, storage, or even individual application capabilities, with the possible exception of limited user-specific application configuration settings.

(ii) Cloud Platform as a Service (PaaS). The capability provided to the consumer is to deploy onto the Cloud infrastructure consumer-created or acquired applications created using programming languages and tools supported by the provider. The consumer does not manage or control the underlying Cloud infrastructure including network, servers, operating systems, or storage, but has control over the deployed applications and possibly applications hosting environment configurations.

(iii) Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying Cloud infrastructure, but has control over operating systems, storage, deployed applications, and possibly limited control of selected networking components (e.g., host firewalls).

Deployment models for Cloud computing comprise:

(i) Private Cloud. The Cloud infrastructure is operated solely by an organization. It may be managed by the organization or a third party and may exist on premise or off premise.

(ii) Community Cloud. The Cloud infrastructure is shared by several organizations and supports a specific community that has shared concerns (e.g., mission, security requirements, policy, and compliance considerations). It may be managed by the organizations or a third party and may exist on premise or off premise.

(iii) Public Cloud. The Cloud infrastructure is made available to the general public or a large industry group and is owned by an organization selling Cloud services.

(iv) Hybrid Cloud. The Cloud infrastructure is a composition of two or more Clouds (private, community, or public) that remain unique entities but are bound together by standardized or proprietary technology that enables data and application portability (e.g., Cloud bursting for load-balancing between Clouds).

It may be noted that Cloud software takes full advantage of the Cloud paradigm by being service-oriented with a focus on statelessness, low coupling, modularity, and semantic interoperability.

The term "Cloud storage" may denote storage components like storage systems of any kind delivering a Cloud storage service in the above sense.

The term "security layer" may denote a component allowing access to a Cloud storage service in a secure way. The security layer may be the component being transparent between a client and a Cloud storage access interface into which a user/a client may log into in order to get connected to a Cloud storage service. The security layer fulfills a series of security and confidentiality functions. It may be implemented as a hardware component or as a software layer.

The term "shared networked storage access interface" or "Cloud storage access interface" may denote a contact point or application programming interface for a client in order to get in touch with a Cloud storage service of a Cloud environment.

The term "key vault system" may denote a system which may be physically separated from a system executing the Cloud storage access interface as well as physically separated from the storage location of the data. It may comprise encryption and decryption capabilities, an access policy governor and a key storage. The key vault system may be instrumental for providing services in the context of the proposed method.

The key vault system may also represent a set of machines and systems in an environment both, physically and logically isolated from the rest of the Cloud zones.

The term "confidentiality rating" may denote a level of confidentiality data are associated with. The highest confidentiality rating may denote that the highest available security standards may be applied to protect the related data. The lowest confidentiality rating may indicate that not every possible protection mechanism may be applied to protect the data. There may be a trade-off between security efforts related to a confidentiality rating and associated costs.

The term "Cloud zone" may denote an area in which storage systems may be physically or logically be located. A Cloud storage provider may run a plurality of storage systems in, e.g., different countries. Each country may, e.g., be assigned a different zone. But there are other options to categorize storage systems. One way may be the physical security of the data center that the storage system may be located in. Another way to categorize the storage systems of a Cloud storage service may be to group storage systems in data centers locally, which are operated under a certain country law. Other options are possible. The only constraint is that the storage systems belonging to the same Cloud zone share a common understanding of security in terms of access of unauthorized personnel.

The term "trust level" may denote a certain security rating of a storage service of a specific Cloud zone. Different Cloud zones may have different trust levels. A higher trust level may denote that stored data may have different vulnerabilities, i.e., the data may be stored according to different security levels.

The term "access governor" may denote a system which may control unwanted files access requests to the key vault system components. The access governor may also be noted as "access policy governor" which may also represent a certification authority being able to both create and validate certificates and associated keys. Its responsibilities may further include checking if data may be transferred from its current storage location to a new target storage location, both, under the aspect of the new target's trustworthiness and security as well as checking if certain data access patterns have been detected that indicate malicious intent (e.g., massive, seemingly random requesting files) of the client.

The term "key storage" may denote another component of the key vault system. It may represent data storage of encryption keys associated with an identifier. This key storage may be used whenever a new file is being encrypted by the key vault system and may be stored as the file's unique encryption key and identifier. It may also be used for a decryption when the key for a given file identifier may be retrieved.

The key storage may be limited in connections for a communication with the access governor and the encryption/decryption units of the key vault system to both unverified and secure key transactions.

The term "encryption/decryption unit" may denote an encryption/decryption system that may be housed on one or more standardized virtual machine(s). Each encryption/decryption unit of an array of encryption/decryption units may be instrumental for an encryption of the new files and the generation of the respective key as well as the decryption with an already existing key. The encryption/decryption units may communicate with the key vault system interface to handle incoming requests, the access governor to verify requests and the key storage to store and retrieve keys. The encryption/decryption units may be equipped with the necessary software and hardware to support the encryption/decryption efforts and may use already existing commercial and open-source products.

A low-profile related encryption/decryption management system may ensure that a configurable number of encryption/decryption units may be ready to handle incoming requests by scaling the number of VMs (virtual machines) as necessary while freeing up resources when the system is idle. The encryption/decryption management system may discard or roll-back encryption/decryption units after a configurable amount of encryption/decryption requests to avoid any accidental contamination of information leftovers due to information/memory leaks in the encryption software/hardware while also reducing the impact of an exploited encryption/decryption unit to the maximum of recent processes since the last recycle.

The term "data container" may denote a logical storage unit, e.g., a file, adapted to store different kind of data in a secure way. Here, the data container may comprise data to be stored as well as a confidentiality rating of the data. The data and the related confidentiality rating may be encrypted within the data container.

The proposed method for storing data in a Cloud environment may offer a series of advantages:

The stored data are secure at rest, meaning the data are secured when they are stored in the Cloud storage system as well when they are in motion. "In motion" may denote that the data may be transferred from the Cloud storage access interface to a storage system or from one storage system to another storage system. This may also be true if the data may be moved from one Cloud zone to another one.

Another advantage may be seen in the fact that the data are stored according to a confidentiality rating. This may motivate users to think about the importance of their data before they may send it to a Cloud storage environment. Different confidentiality ratings may have different price points for the storage service. Thus, a trade-off may be made between security and monetary arguments. Data may get an associated value in an enterprise context.

At the same token, it may be prevented to relocate stored data to a Cloud zone having a lower confidentiality rating than the data itself. And it may be ensured that the data may be treated according to data governance rules.

By use of the key vault system, it may also be guaranteed that data which may have been leaked, stolen, or relocated to an insecure location, may be enforced to be useless.

Last but not least, the stored data may undergo a retroactive relocation, re-encryption and revocation of access privileges, if necessary.

All of these advantages may be based on the fact that no activity may be required from the client side for the secure storage of the data in a Cloud environment. Additionally, on the client side, no client side encryption key management may be required. At the same time, the stored data and the key management may be separated altogether.

According to one embodiment of the method, the receiving the storage request may also comprise authorizing the security layer, in particular from the accessing client side. This may ensure that a trusted communication may be built between the client and the security layer via the Cloud storage access interface. No unauthorized security layer may receive data to be stored.

According to a related embodiment of the method, receiving the storage request may comprise authorizing a sender of the request, in particular the client, by the security layer. This may ensure that the requester and the receiver of the communication may trust each other in a security sense.

According to a further embodiment of the method, messages sent between the security layer and the key vault system may be encrypted. Also this aspect enhances the security and trustworthiness of the complete system public/private key techniques of asymmetric protocols or symmetric protocols which may be instrumental. The messages passed back and forth may comprise the data to be stored. Hence, they may be encrypted.

According to an enhanced embodiment of the method, messages conveyable from and/or receivable by the security layer, in particular to/from an external source, i.e., the client, may be encrypted. Also this feature increases the security level of the overall system. Thus, also these messages including the data to be stored in the Cloud environment may be encrypted on the way from the client system to the security layer via the Cloud storage access interface.

One embodiment of the method may comprise validating by the key vault system that the storage request of the client may be compliant with configurable policies. Such policies may be validated by the access governor of the key vault system. The policies may comprise rules about which a user is allowed to store according to what, how much, during which dates, with what content, etc. This may be achieved by validating, in particular by the key vault system that the security layer may be trusted for a communication and that a transmission channel between the security layer and the key vault system is secured by a certificate-based encryption. In case of a positive validation, a transfer ticket may be created comprising the authorization—in particular from the sender of the request—requesting store requester information. This may be information about the origin (the requester) of the storage request. Additionally, metadata about the data to be stored may be requested, as well as a signature of the security layer and an expiry time for the storage request. Then, the transfer ticket may be signed, in particular by the access governor before the transfer ticket may be sent back to the security layer.

According to an even further enhanced embodiment, the method may comprise upon receiving the transfer ticket by the security layer from the key vault system, in particular from the access governor, validating the key vault's signature as well as its own signature—in particular, as part of the transfer ticket and in case of a positive result—before the request for the encryption of the data to be stored.

The request for the encryption of the data may comprise the transfer ticket and the data to be stored. The encryption may be performed by an encryption unit which may be part of the key vault system.

An additional embodiment of the method may further comprise: upon receiving the validation of the transfer ticket by the key vault system, (i.e., the encryption/decryption of the key vault system) validating the transfer ticket's signature and expiry time for the storage request, and validating whether the security layer's signature, embedded in the transfer ticket may match the encryption of a file content of the data to be stored. Moreover, this embodiment may comprise validating whether the file identification of the data to be stored may match the actual file to be transferred. This feature may enhance the security of the overall system substantially.

A further embodiment of the method may comprise extracting data from the Cloud storage by determining by the key vault system that the requester is a trusted target according the confidentiality rating of the data. Thus, stored data may not be delivered back to an unknown requester.

According to an embodiment of the method, stored data may attempt to be transferred from a first Cloud zone to a second Cloud zone, e.g., from a private to a public Cloud environment or, from a Cloud storage in one country, (e.g., Germany), to another country, (e.g., the United States). This may be achieved by validating whether the confidentiality rating of the second Cloud zone matches the trust level correspondingly, and rejecting the transfer of stored data from the first Cloud zone to the second Cloud zone if the confidentiality rating does not match the trust level. This mechanism may guarantee that data of a certain confidentiality rating may not be stored in a Cloud zone not having the required trustworthiness.

According to a further embodiment of the method, the confidentiality rating may be determined based on the content of the data to be stored. This determination may be performed by the key vault system. It has the advantage that an automatic determination of the confidentiality rating may be achieved. No manual interaction may be required.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a flow diagram of an embodiment of the inventive method for storing data in a shared networked, i.e., Cloud, environment is given. Afterwards, further embodiments of the method and a related storage sub-system will be described.

FIG. 1 shows a flow diagram of an embodiment of the method 100 for storing data. There may be no limits to the kind or type of data to be stored. The data may be stored in a Cloud environment on Cloud storage systems. The Cloud environment, in particular a private, public or hybrid Cloud environment, may have different confidentiality levels, may comprise a security layer between a Cloud storage and a Cloud storage access interface. This may be an application programming interface (API) for a Cloud storage access.

The method 100 may comprise physically separating, 102, the Cloud storage including the security layer from a key vault system which may—among others—comprise a secure key storage and an encryption/decryption unit.

The method 100 may also comprise receiving, 104, a storage request together with data to be stored in the Cloud storage and together with a confidentiality rating, i.e., a confidentiality rating for the data from a client system. The storage request, together with data and the confidentiality rating, may be received via the Cloud storage access interface by the security layer.

The data to be stored and the confidentiality rating may be encrypted, 106, on request of the security layer by the key vault system into a data container. The Cloud storage may be categorized, 108, into Cloud zones. Each Cloud zone may be assigned a trust level.

Then, the data container, which may now be encrypted, may be stored, 110, in one of the Cloud zones of the Cloud storage such that the trust level of the one of the Cloud zones corresponds to the confidentiality rating. Each Cloud zone may have a corresponding trust level.

Figure 2:
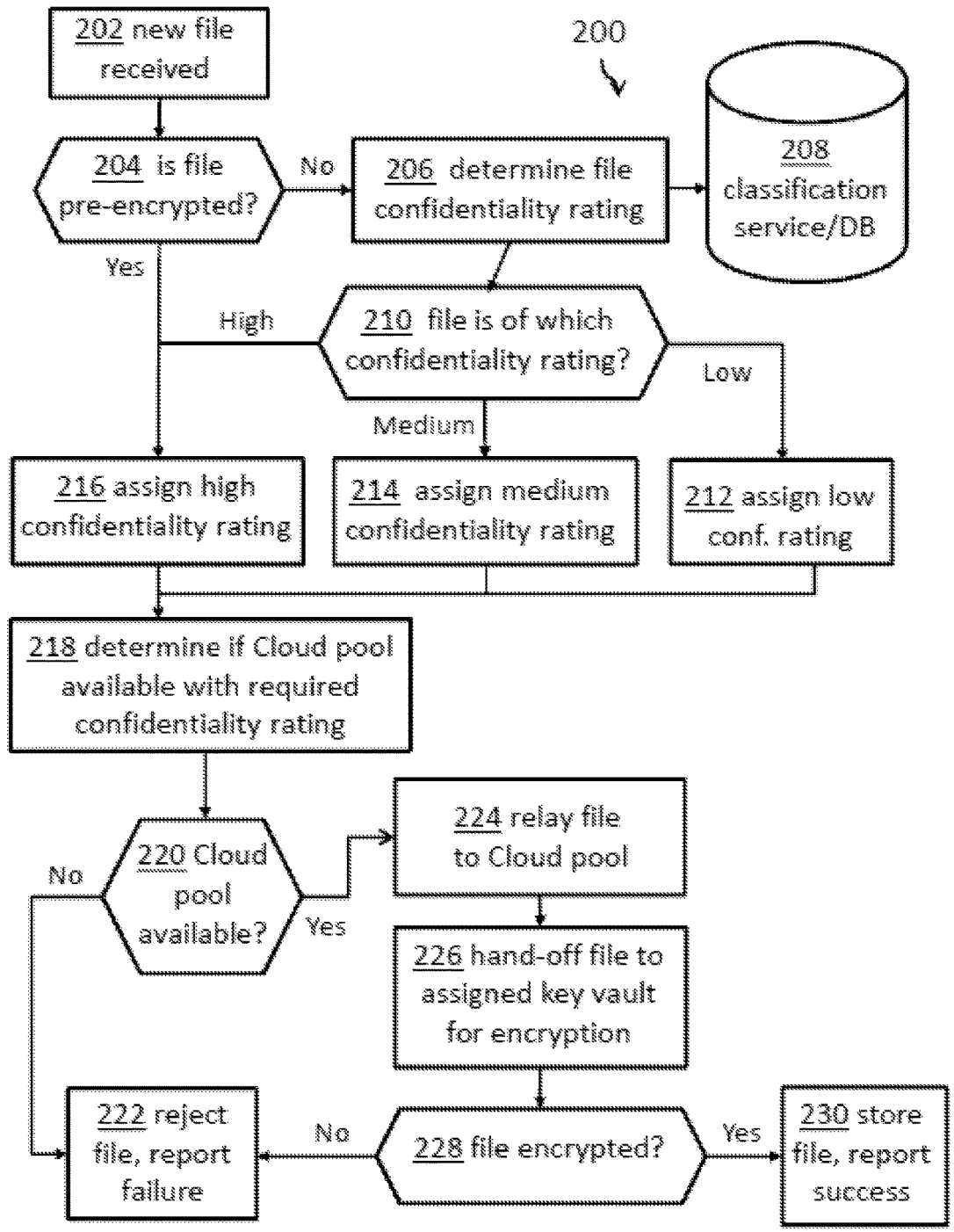
FIG. 2 shows a flow diagram of an embodiment for storing a new file.

FIG. 2 shows a flow diagram 200 of an embodiment for storing a new file via the Cloud storage access interface. The new file may be received, 202, by the Cloud storage access interface. It may be checked, 204, whether the file may be pre-encrypted. In case of "no" the file's confidentiality rating may be determined, 206, in context with a classification service/classification database 208. The confidentiality rating may have three separate ratings: high, medium, and low. However, other additional confidentiality ratings may be available. After a confidentiality rating check 210, a low confidentiality rating may be assigned, 212; in case of "medium", a medium confidentiality rating may be assigned, 214; and, in case of "high", a high confidentiality rating may be assigned, 216.

Next, 218, it may be determined if a Cloud storage pool with an associated trust level compatible with the confidentiality rating may be available. After a check, 220, whether such a Cloud pool is available and a determination that it is not available, the storage request may be rejected, 222, and a failure report may be generated.

In case a Cloud pool may be available, the file may be relayed, 224, to the Cloud storage pool. The file may be encrypted, 226, by the assigned key vault system. Then, it may be checked whether the file may be encrypted, 228. In case of "yes", the file may be stored, 230, and a storage success may be reported. In case of "no", the storage request may be rejected, 222, and the failure may be reported.

Figure 3:
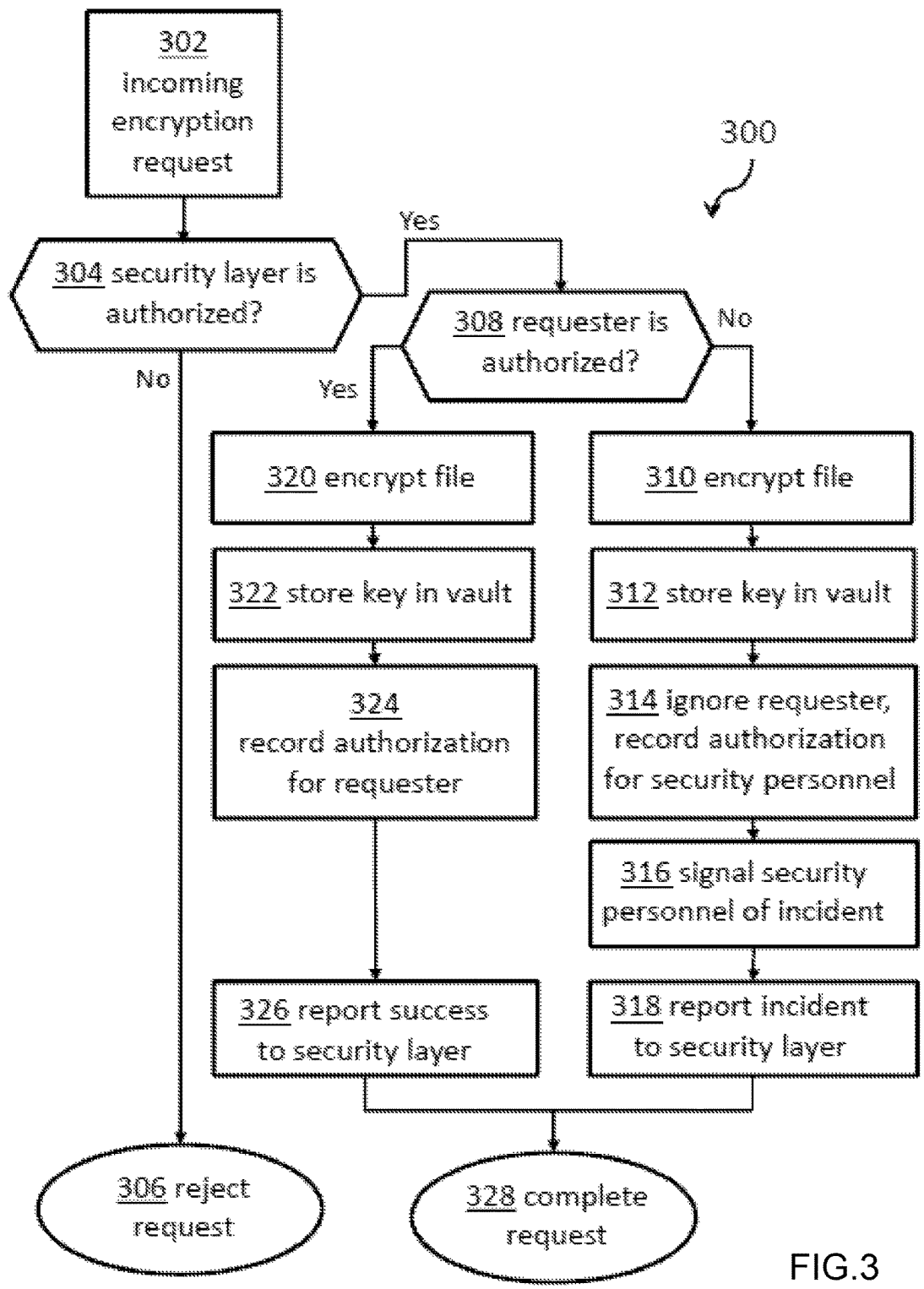
FIG. 3 shows a flow diagram of an embodiment of an incoming encryption request.

FIG. 3 shows a flow diagram 300 of an embodiment of an incoming encryption request. The incoming encryption request may be received, 302. It may be checked, 304, whether the security layer may be authorized. In case of "no" the encryption request may be rejected, 306. In case of "yes", it may be checked, 308, whether the requester may be authorized. In case of "no", the file may be encrypted, 310, the key may be stored, 312, in the key vault system, the requester may be ignored, 314, and may be recorded for the attention of security personnel. The security personnel may receive, 316, a signal regarding the incident, and the incident may be reported, 318 to the security layer.

In case the request that may be authorized, 308, the file may be encrypted, 320, the key may be stored, 322, in the key vault system, the authorization of the request may be recorded, 324, and a success message may be sent, 326, to the security layer. Then, the incoming encryption request may be completed, 328.

Figure 4:
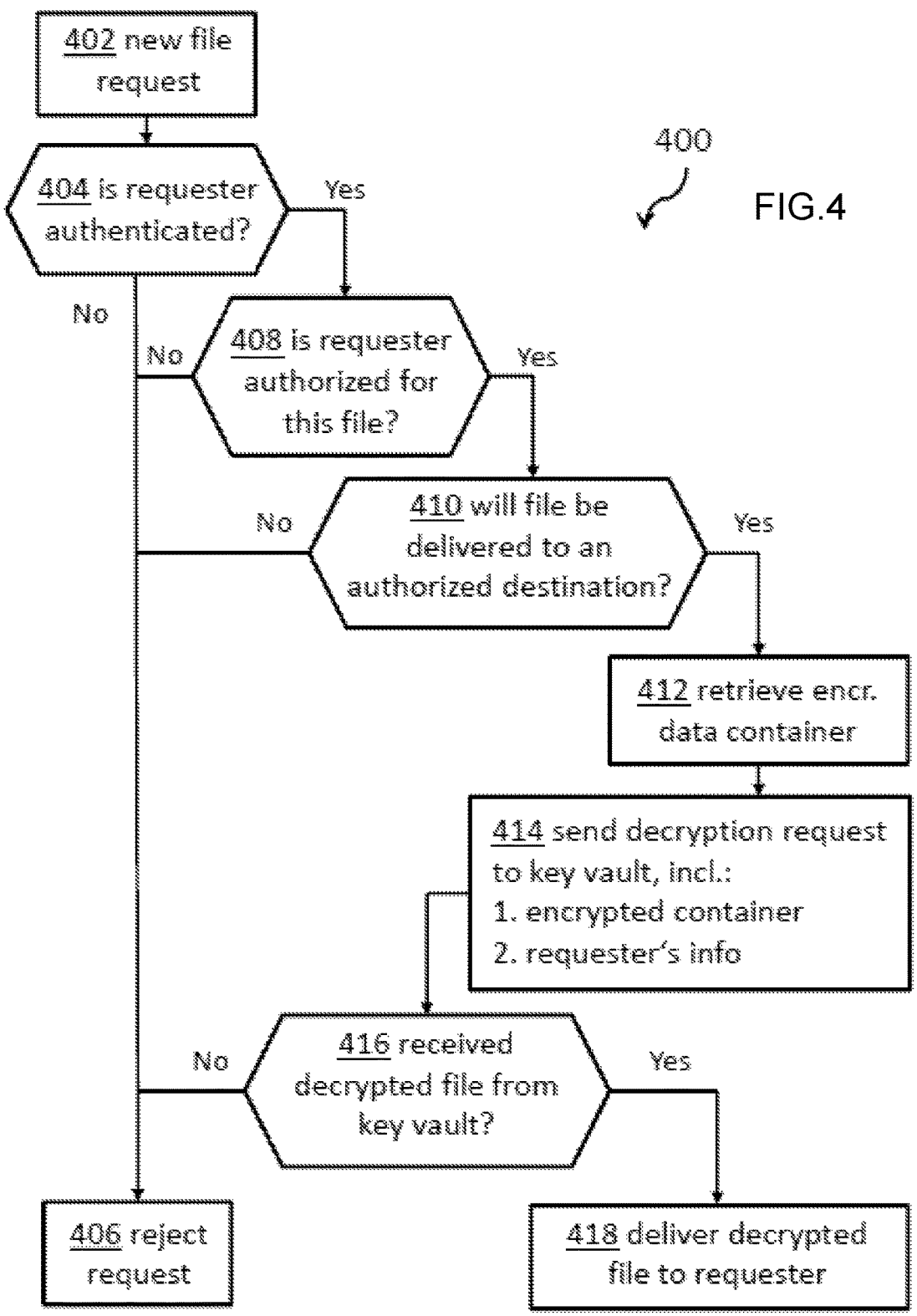
FIG. 4 shows a flow diagram of an embodiment of a request for a file from the Cloud environment.

FIG. 4 shows a flow diagram 400 of an embodiment of a request for a file from the Cloud environment. A request for a new file may be received, 402. It may be checked, 404, whether the requester may be authenticated. In case of "no", the request may be rejected, 406. In case of "yes", it may be checked, 408, whether the requester may be authorized for this file. In case of "yes", it may be checked, 410, whether the file shall be delivered to an authorized destination. Then, in case of "yes," the encrypted data container may be retrieved, 412. A decryption request may be sent, 414, to the key vault system including the encrypted data container and the information about the requester.

It may be checked, 416, whether the decrypted file may have been received from the key vault system. In case of "yes", the file may be delivered, 418, in decrypted form, to the requester. In case of "no", the request may be rejected, 406. In case of "no", at the checks 408 and 410, the request may be rejected, 406, as well.

Figure 5:
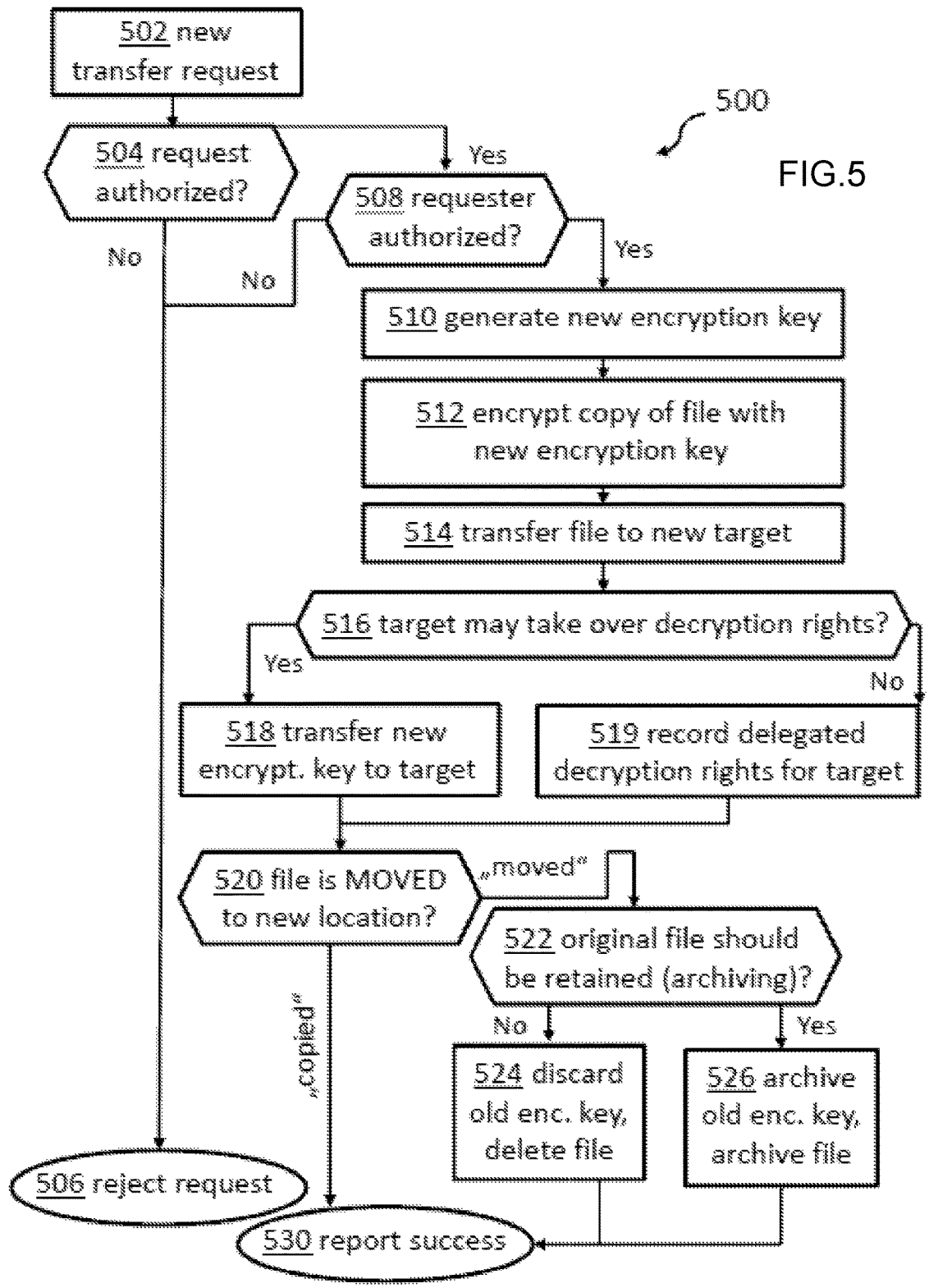
FIG. 5 shows a flow diagram of an embodiment for a transfer request of a file from one Cloud zone to another one.

FIG. 5 shows a flow diagram 500 of an embodiment for a transfer request of a file from one Cloud zone to another Cloud zone. If the new transfer request may be received, 502, it may be checked, 504, whether the request may be authorized. In case of "no", the request may be rejected, 506. In case of "yes", it may be checked, 508, whether the requester may be authorized. In case of "no", the request may be rejected, 506. In case of "yes", a new encryption key may be generated, 510, a copy of the file may be encrypted, 512, with the new encryption key, and the file may be transferred, 514 to the new target destination. It may be checked, 516, whether the target destination may take over the decryption rights. In case of "yes", the new encryption key may be transferred, 518, to the new destination target. In case of "no", the decryption rights for the destination target may be recorded, 519.

Then, it may be checked, 520, whether the file may have been "moved" to the new location/destination target or "copied". In case of "copied", a success report may be generated 530. In case of "moved", for the determination step 520, it may be determined, 522, whether the original file should be retained or archived. In case of "no", the old encryption key and the old file may be deleted, 524. Otherwise (case "yes"), the old encryption key and the file may be archived, 526. Then, success may be reported, 530.

Figure 6:
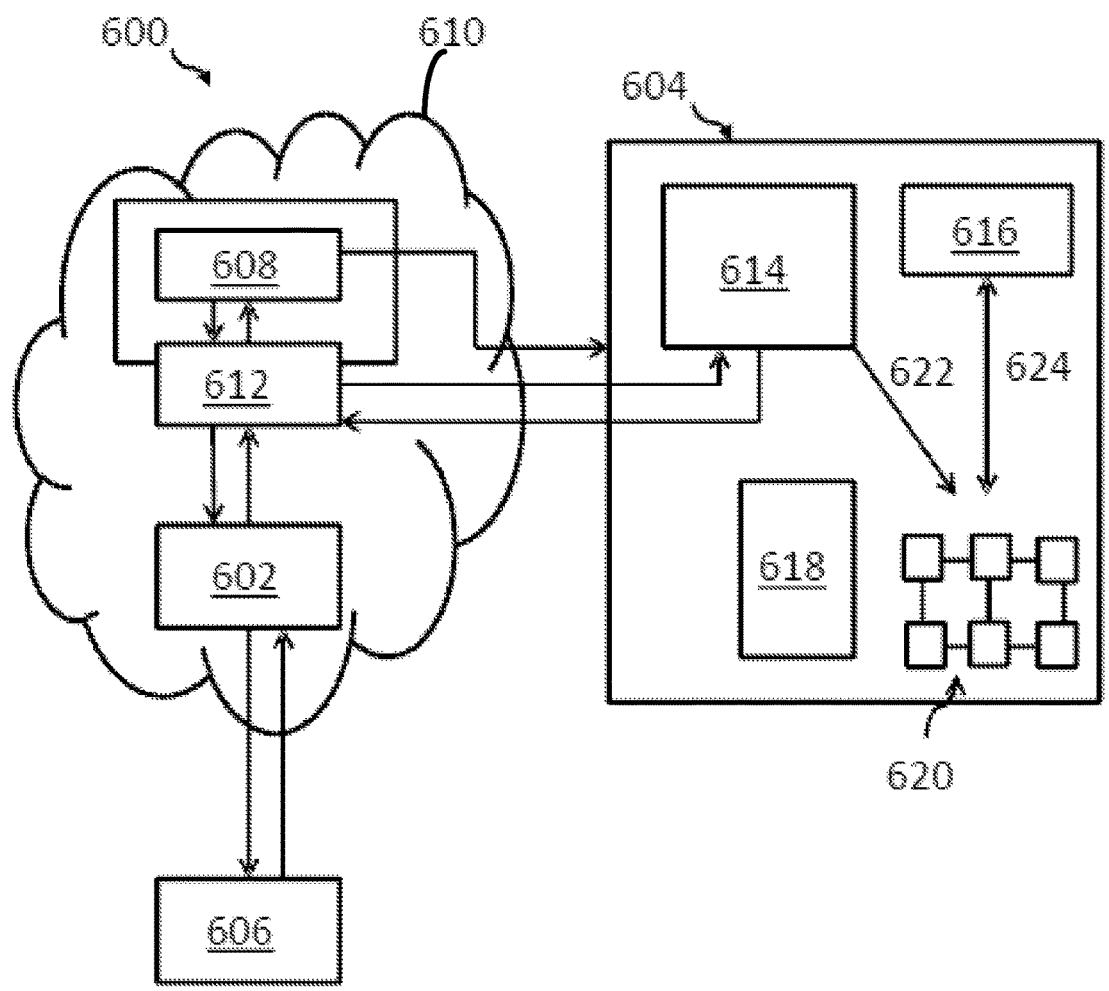
FIG. 6 shows a block diagram of an embodiment of interactions between the Cloud storage access interface and the key vault system.

FIG. 6 shows a block diagram 600 of an embodiment of interactions between the Cloud storage access interface, shared networked storage access interface—known as a Cloud API 602, and the key vault system 604. Requests may be received and/or results may be sent back to a client 606 which is also the sender of a storage request. The data or, in particular the date container 608, may be stored in the networked Cloud environment 610 or, in other words, a shared networked environment. The security layer 612 may be part of a firewall system.

The key vault system 604 may comprise the access policy governor 614, the key storage 616, and an encryption/decryption interface 618 which is connected to an encryption/decryption cluster of encryption/decryption units 620. The key storage 616 may request 624 a key from the encryption/decryption cluster 620 which may also validate data keys on request 622 of the access governor 614.

The Cloud API 602 may be responsible for an authentication and authorization of the client or requester 606. The key vault system 604 and its functionality may now be described in context of the key vault system 604 and along the following interactions and activities with the security layer 612:

Initial Security Checks

A new file upload may be received by the Cloud zone's external interface, the Cloud API 602, which, after successfully authenticating the client 606, will now try to store the file in the data storage area. To do this, it may send a request containing the file itself, the authentication information (e.g., a user ID) and client information (date/time of request, source IP (Internet Protocol) address, client type/product/version number) to the data storage area.

This incoming request will be transparently captured by the security layer 612 which is monitoring the data stream for request streams matching a "file upload" transaction. The security layer may verify that the data stream is being secured using an encrypted transport channel with a trusted certificate. If this is not the case, the transfer will be rejected.

If the transfer is properly secured, the security layer 612 will act similar to a proxy accepting the external interface's data stream without relaying it to a data storage system. Once the data stream's header containing the authentication, client and general file information has been received, it will continue buffering the incoming file data while in parallel proceeding to validate the request with the key vault system 604.

Pre-Flight-Validation by the Key Vault

To do this, the security layer 612 will establish a secure connection to a key vault system 604 interface and send a request to have it validated if the client 606 may upload this kind of file according to the access governor's 614 configured policies. The security layer 612 will provide all of the request information that has been received, without the actual file contents and wait for the key vault system to respond. If the key vault system 604 does not respond within a predefined time period, e.g., 5 seconds, a timeout signal will abort the request and reject the external interface's upload attempt.

During the receipt of the security layer's 612 validation request, the key vault system 604 interface will validate if the security layer 612 is trusted for a communication and if the transmission channel has been secured with a certificate-based encryption. If any of the two criteria fail the transmission is rejected. If the transmission is accepted the key vault system 604 interface will establish a secure connection with the access governor 614 and relay the received request for validation.

The access governor 614 will now check if the client 606 is in general allowed to use the Cloud zone for file uploads, both, in terms of the authenticated user ID for blacklisting in the access governor 604 as well as the source IP address for reputation. This may be done using traditional black-/whitelisting as well as commercial IP reputation products such as IBM's SCA SDK allowing rejecting access from IPs, categorized as malicious, but not controlled or using an anonymous proxy.

The access governor 614 will furthermore check if within a recent time period, such as the last 24 hours, other requests have been made by this user that show anomalous behavior such as massive uploads/downloads, repeated rejected requests, constantly changing IP addresses or questionable client details. This can either be implemented by the access governor 614 directly, or by interfacing with commercial products such as IBM QRadar Anomaly Detection. Anomalous requests may be rejected by the access governor 614 and a security incident report will be generated for responsible security personnel.

If the request is deemed acceptable, the access governor 614 will create a transfer ticket. This transfer ticket may contain the authentication, client and file information provided, the signature of the security layer 612 making the request and an expiry time for the request dependent on the reported file size (e.g., 5 min./250 MB file size, thus, a 1 GB file would have 20 minutes expiry time). The transfer ticket may then be signed by the access governor 614 and handed back to the security layer 612.

Conducting the Encryption

Upon receipt of the transfer ticket, the security layer 612 will validate both, the access governor's 614 signing as well as its own embedded signature. If both checks are OK, it will then start an encryption request to the key vault system 604 interface consisting of the transfer ticket and any data for the file being transferred that has already been buffered so far. To ensure transfer safety, the security layer 612 will encrypt the file data with the public key used by the encryption/decryption units 620 of the key vault system 604. This may ensure that only the encryption/decryption units 620 will be able to read the file in its original version within the key vault system 604 making breaches in the other key vault systems less valuable for an attacker.

As before, the key vault system 604 interface will check the incoming connection's security and afterwards relay the request to the encryption/decryption units 620. One of the encryption/decryption units 620 will pick up the incoming request by going round-robin. The related encryption/decryption management will ensure that there is always one idle encryption/decryption unit 620 available.

The encryption/decryption unit 620, receiving the incoming request, will verify the transfer ticket's signature and expiry time. It may also verify if the encryption on the file content may match the security layer's 612 signature embedded in the ticket. It will furthermore verify that the file identification may match the actual file being transferred. If any of these checks fail the request may be rejected and a security incident report may be generated.

Final Encryption and Content Checking

If all checks pass, the encryption/decryption unit 620 will generate a new key to be finally used for the file once stored. It will then begin decrypting the file using the shared encryption/decryption private key. While the process is running, the encryption/decryption unit 620 will run a content classification on the decrypted data. This process is run multiple times as the data is being decrypted until either all data has been scanned or the file has been classified as the highest confidentiality already. To do so, the encryption/decryption unit 620 can use multiple technologies such as simple pattern matching, Bayesian classification or heuristics. The encryption/decryption units 620 can share a central database of signatures, patterns and/or heuristics to make sure all units have the same synchronous set of classification criteria available.

Based on the classification, the file will be ranked for confidentiality on a scale of 0 to 1 with 0 being non-confidential and 1 being highly confidential information. Once the confidentiality rating has been determined, the encryption/decryption unit 620 will then check if the Cloud zone is a valid target for this confidentiality rating. This can either be done locally on the encryption/decryption unit 620 or by querying the access governor 614 for the current classification policy.

If the current Cloud zone trustworthiness is too low for this file to be stored, the encryption/decryption unit 620 will request the access governor 614 to check if other Cloud zones of higher trustworthiness have been registered with it. If this is the case, the access governor 614 will update the transfer ticket with the security layer 612 of the more secure Cloud zone as target and report this back to the encryption/decryption unit 620. If no suitable Cloud zone may be determined, the request is immediately aborted.

Also, while the file is being decrypted, it is immediately re-encrypted with the generated unique key. The encrypted data stream will be embedded in a container signed with the encryption/decryption unit 620 signature that contains the file's identifier, content classification alongside said data stream. If a final decision on confidentiality has already been reached and the final destination also been determined, the encryption/decryption unit 620 will establish a connection with the responsible security layer 612 and send a storage request with the file's identifier and the re-encrypted data stream for storing on the respective data storage area. Additionally, the encryption/decryption unit 620 will submit the file identifier and associated encryption key to the key storage 616 for safekeeping.

The storage area will validate if the incoming data stream's transfer ticket has the signature of the security layer 612 for the current Cloud zone embedded and afterwards store the data stream. Once the transfer has been completed, the encryption/decryption unit 620 will notify the security layer 612 it has initially received the file from that the transfer has succeeded. If the security layer 612 for storing the file is identical with the one requesting encryption, it will merely report success. If the file has been relayed to another Cloud zone, the encryption/decryption unit 620 will also report the details of the responsible security layer 612 back. This information can then, for example, be used to notify the user of the relaying of the file. The security layer 612 will now report back to the Cloud zone's external interface. The file has been stored successfully.

Downloading an Existent File

The process is very similar to the encryption with the only difference being that the key vault system 604 will check if the requesting client is trusted to retrieve a specific file—or in other words, if the client is a trusted target for the (potentially permanent) storage of a confidential file. The confidentiality of a file will be read from the file's storage container which consists of the file identifier, a confidentiality rating and the encrypted file itself. The access governor 614 will validate the container's signing to ensure the confidentiality rating or file has not been tampered with since storing it. It will use the same validation methods as used during the upload, but may use stricter policies (e.g., only allowing known, whitelisted client versions, blocking any and all negative IP reputation criteria), as the retrieval of files is potentially more dangerous as uploading new ones.

Also, the transfer direction is inverted with the data stream being fetched from the data storage area to the encryption/decryption unit 620 to the security layer 612 and out of the Cloud zone's external interface.

Transfer Between Cloud Zones

This process is very similar to the download of a new file in that the new Cloud zone will be treated as an external client, requesting access to one or more files. The main difference is that the key vault system 604 may decide against handing out a file's encryption key to the new target. This decision may be based on the new Cloud zone's trustworthiness, i.e., configured or a result of an anomaly detection of transfers from/to said Cloud zone or IP Reputation data.

If the key vault system 614 does not want to hand over the encryption key, it may then either reject the transfer completely or, allow a transfer but retain the key. In the latter case, the new Cloud zone will relay all decryption for that file to the original Cloud zone's access governor 614.

This setup may be useful if multiple Cloud zones of differing trustworthiness, e.g., differing service providers, service levels/tiers, exist within close proximity or may be connected via high-bandwidth access.

Added Resiliency Against Attacks

The inventive method may be infused with additional security mechanisms by employing existing off-the-shelf solutions such as Trusted Platform Modules (TPM), ensuring a tamper-proof storage of key data, and UEFI (Unified Extensible Firmware Interface) Secure Boot to run on unmodified operating systems only.

The inventive method may enforce the usage of these technologies by refusing the startup unless a TPM device is available and the operating system has been booted using UEFI Secure Boot.

Furthermore, the software, running on any of the components, may be equipped to check all binaries for valid, trusted signing, refusing to run if the signature of any of the components is not matching, compromised or expired.

Additionally, the inventive method may use the unique signatures of UEFI boot when signing transactions, e.g., for the access governor 614, the key vault system's 604 encryption/decryption units 620, for ensuring that a system that has no untrusted or mismatching UEFI signature from communicating with other systems. Ultimately, this may create a chain of verifications going up from the system UEFI BIOS to the operating system which in turn may verify all components on the system are uncompromised. If an attacker would attempt to change a system component, this tampering could be detected by rigorous signature checks.

Depending on the deployment, continuous, certified updates can also be leveraged as a security measure. By keeping the validity on certificates low (e.g., just a few hours) and requiring the constant re-deployment of smaller but central verification components from a trusted source (e.g., the vendor), even intermittent tampering would only be possible for a few hours—it would otherwise be detected by the refreshed component or the components would stop working, as their certification has expired.

For physical security, a tamper-resistant hardware solution may be devised that is sealed from the outside—apart from air, power and communication connections—and may protect against intrusion attempts, e.g., by monitoring the opening of any of the service hatches, disruption sensors for the outer shell to detect drilling of holes, and active noise generation to suppress the reading of keys by measuring coil whine and fan cycles.

If a possible security breach may have been detected, the invention would immediately destroy all stored keys software-wise, and could even deploy a localized EMP generator or other physical means, e.g., controlled explosions, to ensure an attacker has little to no ability to get useful information from the break-in attempt.

In case a destructive intrusion countermeasure may be deployed, the invention may be extended to be able to use a limited number of universal decryption keys per customer that may be stored in a separate location. Additionally, the syncing with other trusted instances of the invention for the case of disaster recovery can be used to ensure that customers retain the ability to access their files. This is, however, is optional and may not be used if complete inaccessibility of the data is preferable to having a "backup key" that could potentially circumvent the segmentation of data.

Usage of Asymmetrical vs. Symmetrical Encryption

The inventive method largely uses certificate-based asymmetrical encryption for all communications to ensure all transactions are secured. However, depending on the available performance, this may somewhat slow down the processing of files. Such a situation may be diminished by technological progress as CPU-cycles become less and less expensive but can never-the-less add up and become a limitation for the near future.

If this is the case, the invention may relax the requirement of asymmetrical encryption and work with symmetrical encryption once a transaction for a file has been established.

Additionally, the invention may secure communications between the components in general using symmetrical encryption once a trusted relationship has been established by a human operator. If this is the case, the invention will handle all communications with the exchanged key instead of doing the full asymmetrical handshaking speeding up communications. To keep security at acceptable levels, the inventive method may rotate the key in short intervals, e.g., every 10 minutes, and after a predetermined number of transactions, e.g., 500, whichever comes first, to stop key cracking attacks from potential third-parties conducting a man-in-the-middle attack.

Figure 9:
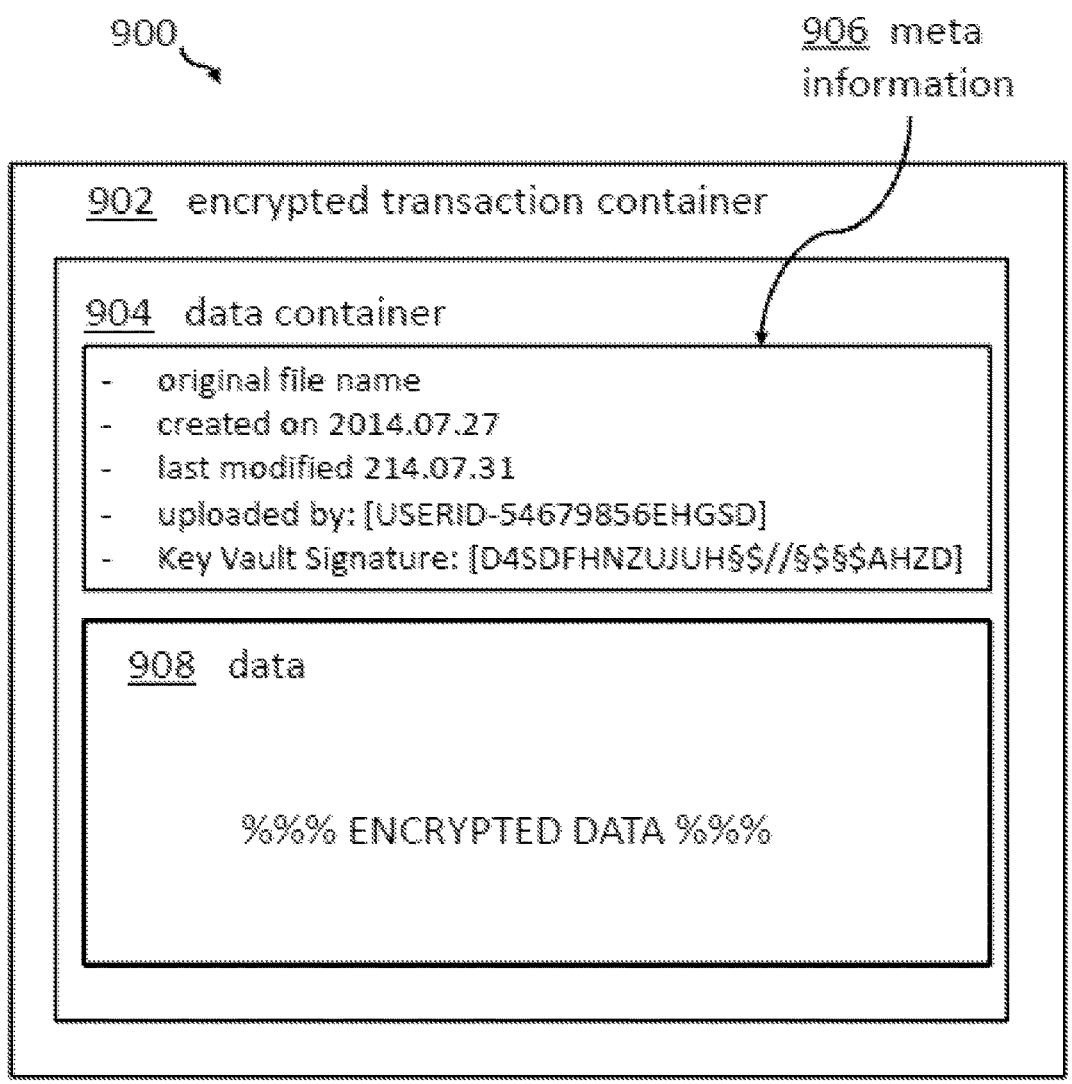
FIG. 9 shows the implemented container-in-container security mechanism, according to an embodiment.

In this context, it may be helpful to have a look at the container-in-container concept for data protection. FIG. 9 shows the embedding principle 900. The outer layer is represented by an encrypted transaction container which is only readable by the security layer 612 (compare FIG. 6). Part of the encrypted transaction container 902 is a transaction ID (identifier) identifying this encrypted transaction container 902 in transition. The data container 904 inside the encrypted transaction container 902 comprises at least two elements: meta information 906 about the file. This meta information is also only readable by the security layer 612. Inside the data container 904 is also the stored file in encrypted form 908.

Thus, the file 908 to be stored 908 may not be compromised even if the container 904 may be in transition from one Cloud zone to another. The container-in-container concept make this impossible.

Figure 7:
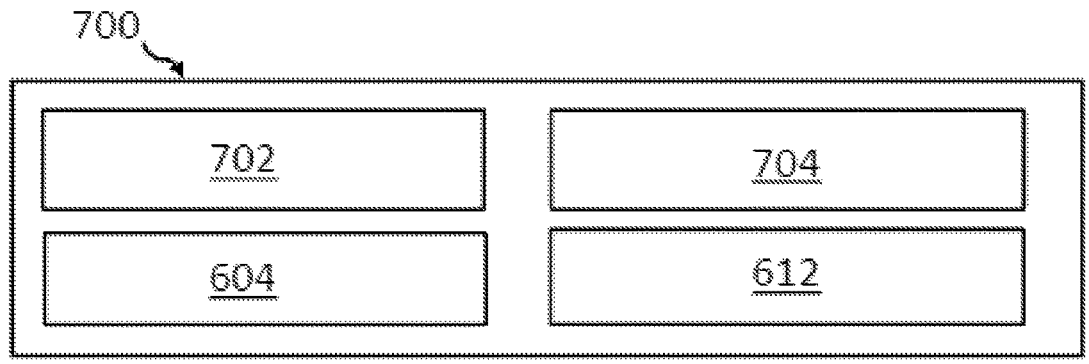
FIG. 7 shows a block diagram of an embodiment of the inventive storage sub-system.

As an overview and a summary, FIG. 7 shows a block diagram of the inventive storage sub-system 700 for storing data in a shared networked environment—known as Cloud environment. The Cloud environment comprises a security layer 612 between Cloud storage and a Cloud storage access interface (not shown). The storage sub-system 700 comprises a Cloud storage including the security layer 612 which is physically separated from a key vault system 604. The Cloud storage comprises Cloud zones, wherein each of the Cloud zones has an assigned trust level. The storage sub-system 700 comprises receiving unit 702 adapted for receiving a storage request together with data to be stored in the Cloud storage and together with a confidentiality rating. The storage request together with data and the confidentiality rating is received via the Cloud storage access interface by the security layer 612. The key vault system 604 is adopted for encrypting the data to be stored and the confidentiality rating on request of the security layer 612 into a data container.

The storage sub-system 700 comprises as well a storage component 704 adapted for storing the data container in one of the Cloud zones of the Cloud storage such that the trust level of the one of the Cloud zones corresponds to the confidentiality rating.

Figure 8:
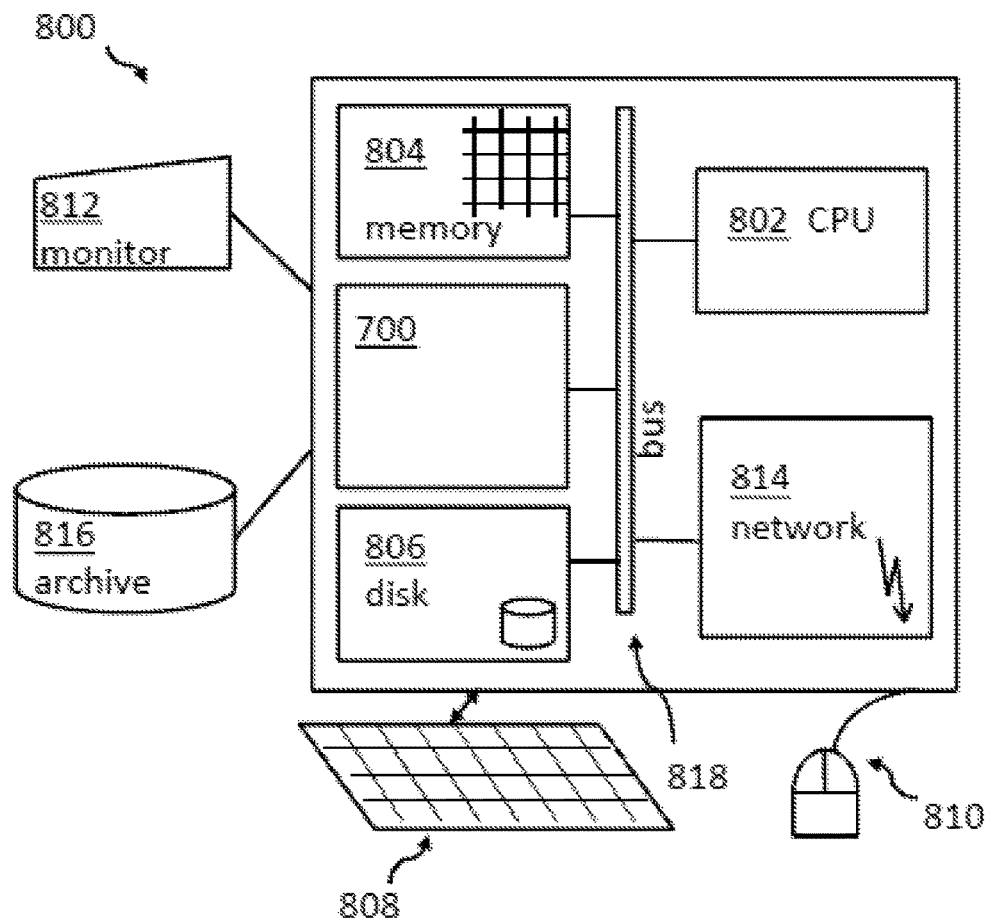
FIG. 8 shows an embodiment of a computing system comprising the storage sub-system or parts thereof.

Embodiments of the invention may be implemented together with virtually any type of computer, regardless of the platform being suitable for storing and/or executing program code. For example, as shown in FIG. 8, a computing system 800 may include one or more processor(s) 802 with one or more cores per processor, associated memory elements 804, an internal storage device 806 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 804 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 816 for an execution. Elements inside the computer 800 may be linked together by means of a bus system 818 with corresponding adapters. Additionally, the storage sub-system 700 for storing data in a Cloud environment may be attached to the bus system 818.

The computing system 800 may also include input means such as a keyboard 808, a pointing device such as a mouse 810, or a microphone (not shown). Alternatively, the computing system may be equipped with a touch sensitive screen as main input device. Furthermore, the computer 800, may include output means such as a monitor or screen 812 [e.g., a liquid crystal display (LCD), a plasma display, a light emitting diode display (LED), or cathode ray tube (CRT) monitor]. The computer system 800 may be connected to a network [e.g., a local area network (LAN), a wide area network (WAN)], such as the Internet or any other similar type of network, including wireless networks via a network interface connection 814. This may allow a coupling to other computer systems, or a storage network, or a tape drive. Those, skilled in the art will appreciate that many different types of computer systems exist, and the aforementioned input and output means may take other forms. Generally speaking, the computer system 800 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store, a program for use, by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flowchart and/or block diagram, block, or blocks.

The block diagrams in the figures illustrate the architecture, functionality, and operation of possible implementations of systems, methods and computer program products, according to various embodiments of the present disclosure. In this regard, each block in the block diagrams may represent a module, segment, or portion of code, which comprises one or more executable instructions for implementing the specified logical function(s). It should also be noted that, in some alternative implementations, the functions, discussed hereinabove, may occur out of the disclosed order. For example, two functions taught in succession may, in fact, be executed substantially concurrently, or the functions may sometimes be executed in the reverse order depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. A method for storing data in a shared networked environment, the shared networked environment comprising a security layer between a shared networked storage and a shared networked storage access interface, the method comprising:

physically separating the shared networked storage from a key vault system;

receiving a storage request together with data to be stored in the shared networked storage and receiving the storage request together with a confidentiality rating, the confidentiality rating indicating a level of confidentiality the data is associated with, wherein the storage request together with the data and the confidentiality rating is received via the shared networked storage access interface by the security layer;

encrypting, on request of the security layer and into a data container, the data to be stored by the key vault system, and encrypting, into the data container, the confidentiality rating;

categorizing the shared networked storage into Cloud zones, wherein each Cloud zone is assigned a trust level;

storing the data container in one of the Cloud zones of the shared networked storage, wherein the trust level of the one of the Cloud zones corresponds to the confidentiality rating;

validating that the security layer is trusted for communication and validating that a transmission channel between the security layer and the key vault system is secured by a certificate-based encryption;

creating a transfer ticket, the transfer ticket comprising a first signature made by the security layer and a second signature made by the key vault system; and sending the transfer ticket to the security layer.

2. The method of claim 1, wherein the receiving the storage request comprises authorizing the security layer from a client that is accessing the data to ensure that a trusted communication is built between the client and the security layer via the network storage access interface.

3. The method of claim 1, wherein the receiving the storage request comprises authorizing a sender of the request.

4. The method of claim 1, wherein messages sent between the security layer and the key vault system are encrypted, and wherein the messages include the data.

5. The method of claim 1, wherein messages conveyable from and/or receivable by the security layer are encrypted, and wherein the messages include the data.

6. The method of claim 1, further comprising upon receiving the transfer ticket by the security layer from the key vault system, validating the first signature and the second signature before the request for the encryption of the data to be stored, wherein the request for the encryption of the data includes the transfer ticket and the data to be stored.

7. The method of claim 1, further comprising:
  receiving a validation of the transfer ticket by the key vault system;
  validating, in response to the validation of the transfer ticket, the second signature and expiry time for the storage request;
  validating whether the first signature, embedded in the transfer ticket, matches the encryption of a file content of the data to be stored, and
  validating whether a file identification of the data to be stored matches an actual file to be transferred.

8. A computer program product for storing data in a shared networked environment, the shared networked environment comprising a security layer between a shared networked storage and a shared networked storage access interface, the computer program product comprising a non-transitory computer readable storage medium having program instructions embodied therewith, the program instructions executable by a computing device to cause the computing device to perform a method, the method comprising:
  physically separating the shared networked storage from a key vault system;
  receiving a storage request together with data to be stored in the shared networked storage and receiving the storage request together with a confidentiality rating, the confidentiality rating indicating a level of confidentiality the data is associated with, wherein the storage request together with the data and the confidentiality rating is received via the shared networked storage access interface by the security layer;
  encrypting, on request of the security layer and into a data container, the data to be stored by the key vault system, and encrypting, into the data container, the confidentiality rating;
  categorizing the shared networked storage into Cloud zones, wherein each Cloud zone is assigned a trust level;
  storing the data container in one of the Cloud zones of the shared networked storage, wherein the trust level of the one of the Cloud zones corresponds to the confidentiality rating;
  validating that the security layer is trusted for communication and validating that a transmission channel between the security layer and the key vault system is secured by a certificate-based encryption;
  creating a transfer ticket, the transfer ticket comprising a first signature made by the security layer and a second signature made by the key vault system; and
  sending the transfer ticket to the security layer.

9. The computer program product of claim 8, wherein the method further comprises extracting the data from the one of the cloud zones by determining that the requester is a trusted target using the confidentiality rating of the data.

10. The computer program product of claim 8, wherein the method further comprises transferring, subsequent to the storing of the data container, the data from a first Cloud zone to a second Cloud zone of the networked storage by:
  validating that the confidentiality rating of the second Cloud zone matches the trust level correspondingly, and
  transferring the data from the first Cloud zone to the second Cloud zone.

11. The computer program product of claim 8, wherein a determining of the confidentiality rating is based on a content of the data.

12. The computer program product of claim 8, wherein the method further comprises: upon receiving the transfer ticket by the security layer from the key vault system, validating the first signature and the second signature before the request for the encryption of the data to be stored, wherein the request for the encryption of the data comprises the transfer ticket and the data to be stored.

13. A system for storing data in a shared networked environment, the shared networked environment comprising a security layer between a shared networked storage and a shared networked storage access interface, the system comprising:
  a memory;
  a shared networked storage including the security layer, the security layer physically separated from key vault system, wherein the shared networked storage comprises Cloud zones, wherein each of the Cloud zones has an assigned trust level;
  a receiving unit adapted to receive a storage request together with data to be stored in the shared networked storage and together with a confidentiality rating, wherein the storage request together with that data and the confidentiality rating is received via the shared networked storage access interface by the security layer;
  wherein the key vault system is adapted to encrypt the data to be stored and the confidentiality rating on request of the security layer into a data container;

a storage component adapted to store the data container in one of the Cloud zones of the shared networked storage, wherein the trust level of the one of the Cloud zones corresponds to the confidentiality rating;

wherein the key vault system is further adapted to, validate that the storage request is compliant with configurable policies by:

validating that the security layer is trusted for communication and validating that a transmission channel between the security layer and the key vault system is secured by a certificate-based encryption;

creating a transfer ticket, the transfer ticket comprising a first signature made by the security layer and a second signature made by the key vault system; and sending the transfer ticket to the security layer.

14. The system of claim 13, wherein the system is a part of a Cloud storage system for storing the data in the shared networked environment.

15. The system of claim 13, wherein the key vault system is further adapted to:

receive a validation of the transfer ticket;

validate, in response to the validation of the transfer ticket, the second signature and expiry time for the storage request;

validate whether the first signature, embedded in the transfer ticket, matches the encryption of a file content of the data to be stored; and validate whether a file identification of the data to be stored matches an actual file to be transferred.

16. The system of claim 13, wherein the data container is inside of an encrypted transaction container, the encrypted transaction container is readable only by the security layer, and wherein the encrypted transaction container includes a transaction identifier to identify the encrypted transaction container.

17. The system of claim 13, wherein the cloud zones are areas in which storage systems are physically located, the cloud zones including a first cloud zone and a second cloud zone, and wherein the first cloud zone corresponds to a first country and the second cloud zone corresponds to a second country.

* * * * *